United States Patent
Guo

(10) Patent No.: US 10,863,341 B2
(45) Date of Patent: Dec. 8, 2020

(54) METHOD AND APPARATUS OF IMPROVING PROXIMITY SERVICE DISCOVERY IN A WIRELESS COMMUNICATION SYSTEM

(71) Applicant: INNOVATIVE SONIC CORPORATION, Taipei (TW)

(72) Inventor: Yu-Hsuan Guo, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 624 days.

(21) Appl. No.: 14/080,179

(22) Filed: Nov. 14, 2013

(65) Prior Publication Data
US 2014/0141777 A1 May 22, 2014

Related U.S. Application Data

(60) Provisional application No. 61/727,295, filed on Nov. 16, 2012, provisional application No. 61/735,969, filed on Dec. 11, 2012.

(51) Int. Cl.
*H04W 8/00* (2009.01)
*H04W 92/18* (2009.01)

(52) U.S. Cl.
CPC ............ *H04W 8/005* (2013.01); *H04W 92/18* (2013.01)

(58) Field of Classification Search
CPC . H04W 36/0072; H04W 8/005; H04W 4/008; H04W 48/10; H04W 48/12; H04W 48/14; H04W 76/023; H04W 88/06
USPC ....... 455/434, 41.1, 41.2, 515–517, 524, 59, 455/63.1, 63.2, 553.1
See application file for complete search history.

(56) References Cited

U.S. PATENT DOCUMENTS

| | | | |
|---|---|---|---|
| 7,949,358 B2 * | 5/2011 | Wentink | H04W 8/005 455/515 |
| 9,220,054 B2 * | 12/2015 | Gong | H04W 48/12 |
| 9,554,262 B2 * | 1/2017 | Johnsson | H04W 76/14 |
| 2007/0232347 A1 * | 10/2007 | Persson | H04L 12/5865 455/550.1 |
| 2009/0232142 A1 | 9/2009 | Li et al. | |
| 2009/0296675 A1 | 12/2009 | Tenny et al. | |
| 2011/0228666 A1 * | 9/2011 | Barbieri | H04W 76/023 370/216 |
| 2011/0258313 A1 | 10/2011 | Mallik et al. | |
| 2012/0147745 A1 | 6/2012 | Wang et al. | |
| 2013/0159522 A1 * | 6/2013 | Hakola | H04L 63/0823 709/225 |
| 2014/0004796 A1 * | 1/2014 | Cakulev et al. | 455/41.2 |

(Continued)

OTHER PUBLICATIONS

3GPP TR 22.803 V1.0.1 (Aug. 2012).
Office Action on corresponding TW Patent Application No. 102141596 dated May 4, 2015.

*Primary Examiner* — Magdi Elhag
(74) *Attorney, Agent, or Firm* — Blue Capital Law Firm, P.C.

(57) ABSTRACT

A method and apparatus are disclosed to provide proximity service discovery in a wireless communication system. The method includes receiving, from a first user equipment, a discovery signal by a second user equipment for discovering or being discovered. The method further includes transmitting, from the second user equipment, a discovery check signal to a network in response to the discovery signal to check a discovery result.

8 Claims, 12 Drawing Sheets

(56) References Cited

U.S. PATENT DOCUMENTS

| | | | | |
|---|---|---|---|---|
| 2014/0065967 A1* | 3/2014 | Shen | ............... | H04W 80/00 455/41.2 |
| 2014/0066001 A1* | 3/2014 | Lee | ............... | H04W 4/023 455/404.2 |
| 2014/0080481 A1* | 3/2014 | Abraham et al. | ............ | 455/434 |

* cited by examiner

METHOD AND APPARATUS OF IMPROVING PROXIMITY SERVICE DISCOVERY IN A WIRELESS COMMUNICATION SYSTEM

CROSS-REFERENCE TO RELATED APPLICATIONS

The present application claims the benefit of U.S. Provisional Patent Application Ser. No. 61/727,295 filed on Nov. 16, 2012 and U.S. Provisional Patent Application Ser. No. 61/735,969 filed on Dec. 11, 2012, the entire disclosures of which are both incorporated herein by reference.

FIELD

This disclosure generally relates to wireless communication networks, and more particularly, to methods and apparatuses for proximity service discovery in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed to provide proximity service discovery in a wireless communication system. The method includes receiving, from a first user equipment, a discovery signal by a second user equipment for discovering or being discovered. The method further includes transmitting, from the second user equipment, a discovery check signal to a network in response to the discovery signal to check a discovery result.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RP-121435, "Study on LTE Device to Device Proximity Discovery", TR 22.803 V1.0.0, "Feasibility Study for Proximity Services (ProSe)", TS 36.331 V11.1.0, "E-UTRA RRC protocol specification (Release 11)", TS 36.321 V11.0.0, "E-UTRA MAC protocol specification (Release 11)", SP-110638, "WID on Proposal for a study on Proximity-based Services", and TS 23.003 V11.3.0, "Numbering, addressing and identification." The standards and documents listed above are hereby expressly incorporated herein.

Figure 1:
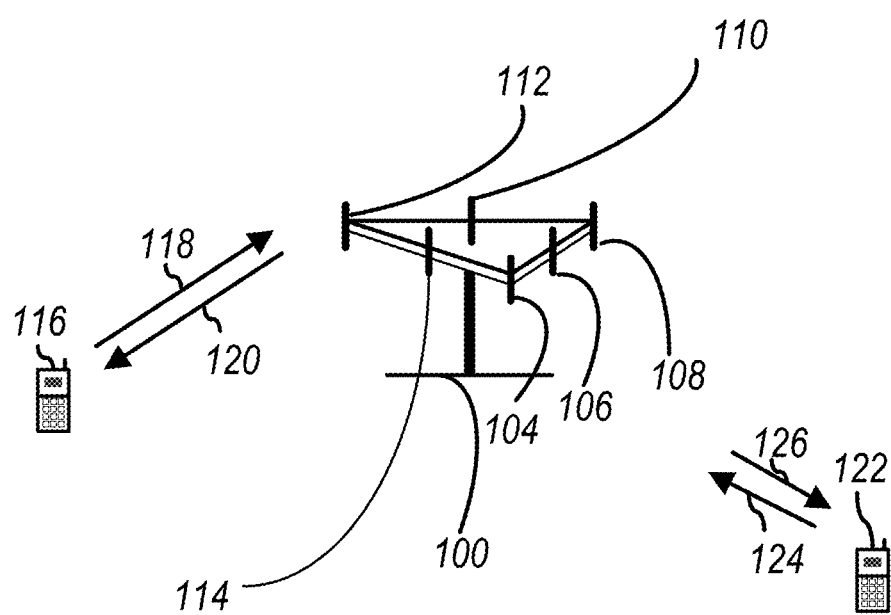
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
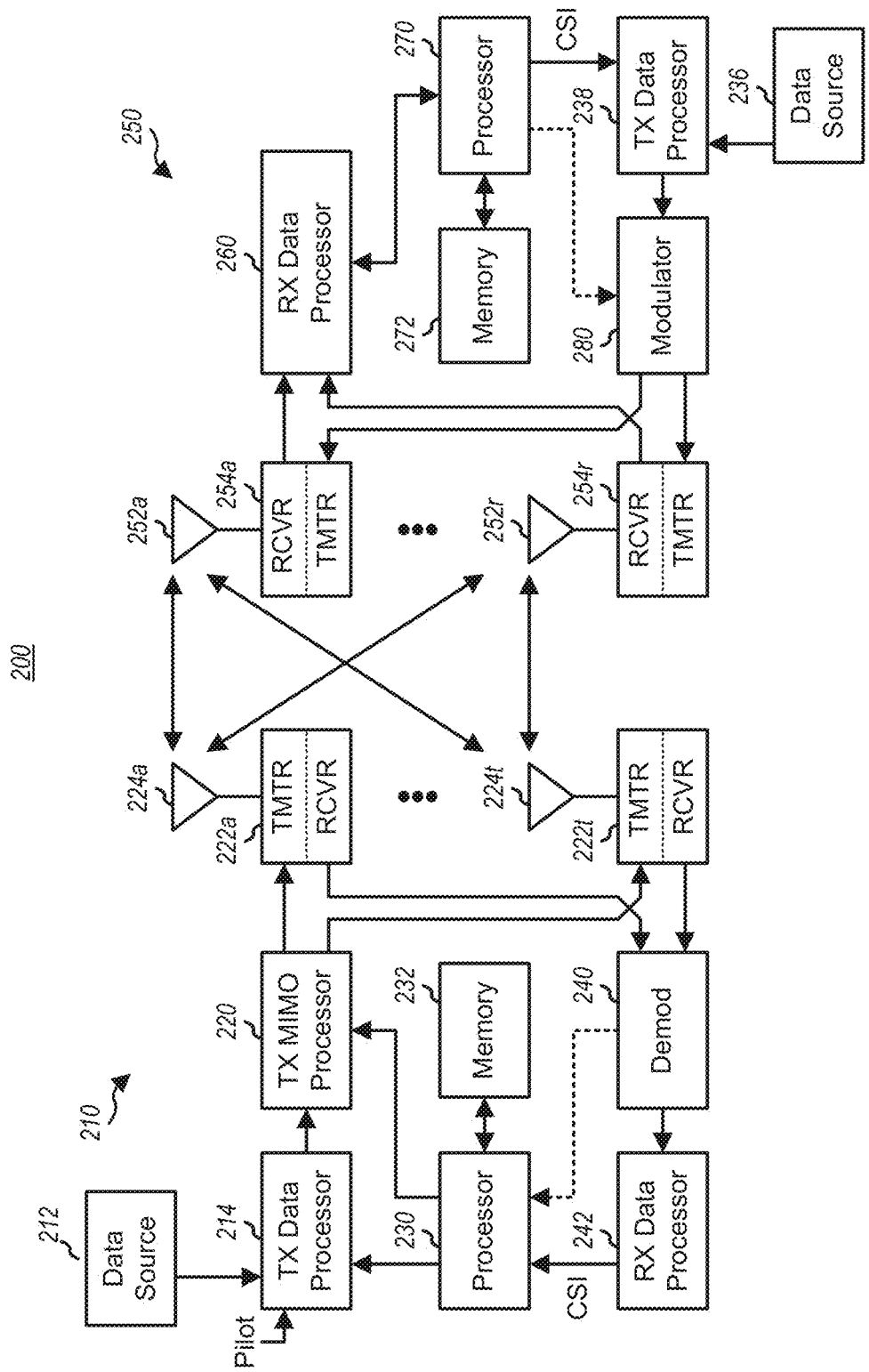
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
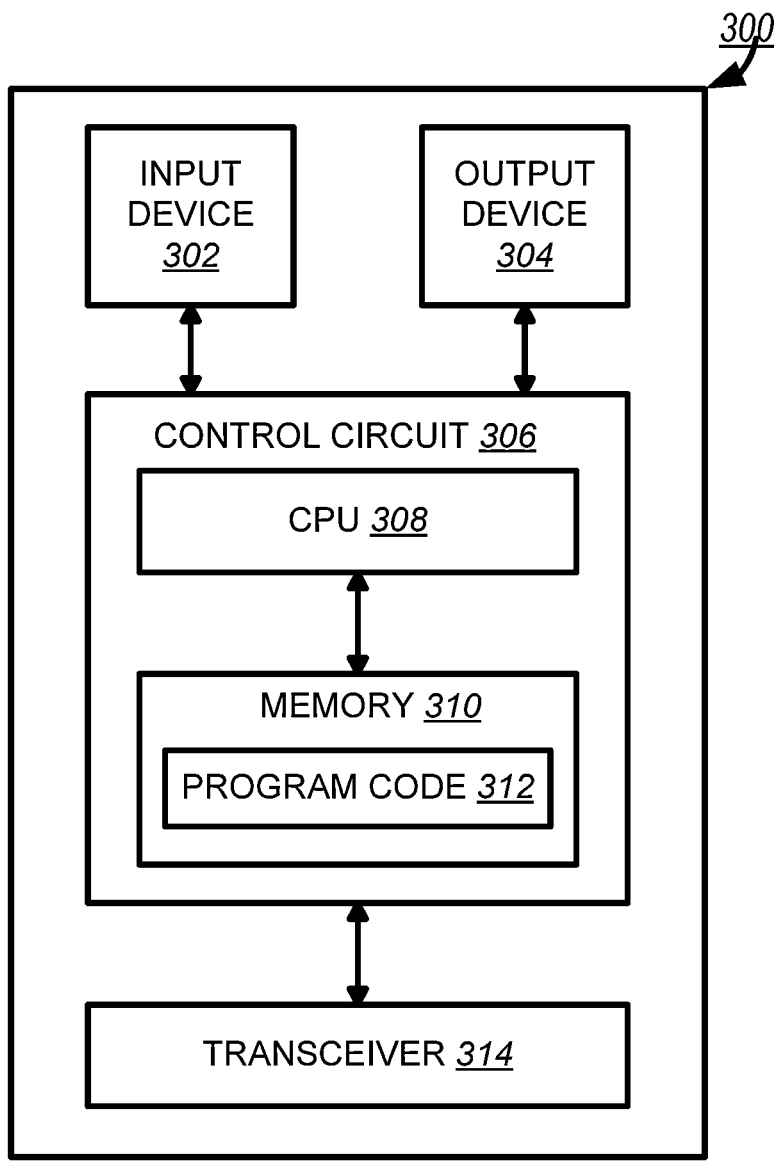
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
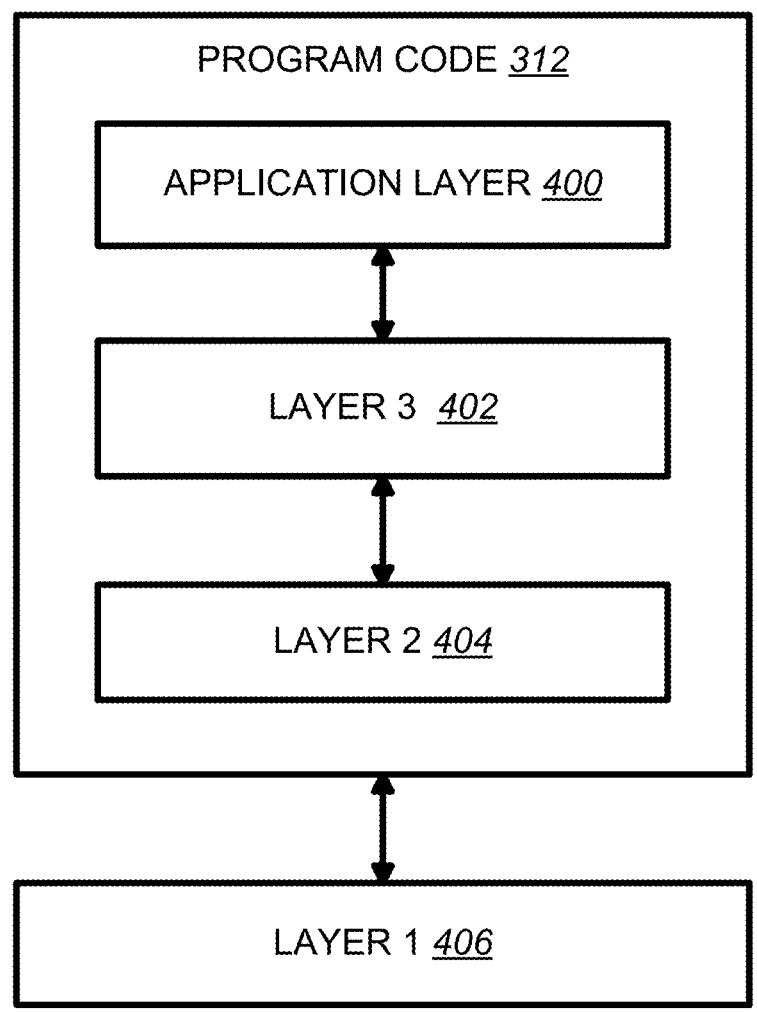
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion may include a Radio Link Control (RLC) layer and a Medium Access Control (MAC) layer. The Layer 3 portion may include a Radio Resource Control (RRC) layer.

Device to device discovery and communication for proximity services is expected to be an important feature for LTE in future, e.g. in Rel-12. The discussion on the feasibility study for Proximity Services (ProSe) is ongoing and captured in 3GPP TR 22.803 V1.0.0, "Feasibility Study for Proximity Services (ProSe)." The objective of this study is quoted below:

> The objective is to study use cases and identify potential requirements for operator network controlled discovery and communications between UEs that are in proximity, under continuous network control, and are under 3GPP network coverage, for:
> 1. Commercial/social use
> 2. Network offloading
> 3. Public Safety
> 4. Integration of current infrastructure services, to assure the consistency of the user experience including reachability and mobility aspects
>
> Additionally, the study item will study use cases and identify potential requirements for
> 5. Public Safety, in case of absence of EUTRAN coverage (subject to regional regulation and operator policy, and limited to specific public-safety designated frequency bands and terminals).

In 3GPP TR 22.803 V1.0.0, "Feasibility Study for Proximity Services (ProSe)", ProSe includes two main functions: ProSe Discovery and ProSe Communication. ProSe Discovery is a process that identifies that a UE is in proximity of another, using E-UTRA. ProSe Communication is a communication between two UEs in proximity by means of a communication path established between the UEs. The communication path could for example be established directly between the UEs or routed via local eNB(s).

A UE that supports ProSe Discovery and/or ProSe Communication is called a ProSe-enabled UE. ProSe Discovery may be either Open ProSe Discovery, i.e. without explicit permission from the UE being discovered, or Restricted ProSe Discovery, i.e. with explicit permission from the UE being discovered.

Figure 5:
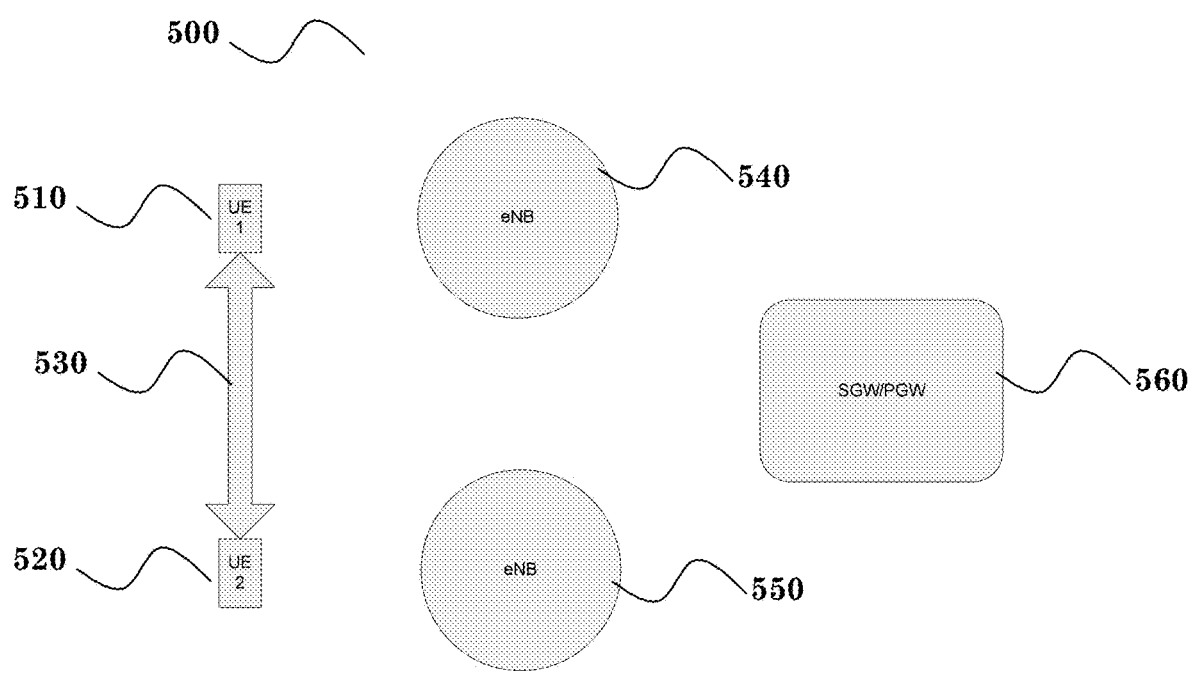
FIG. 5 is a block diagram of a direct mode data path in the Evolved Packet System (EPS) for communication between two UEs.
Figure 6:
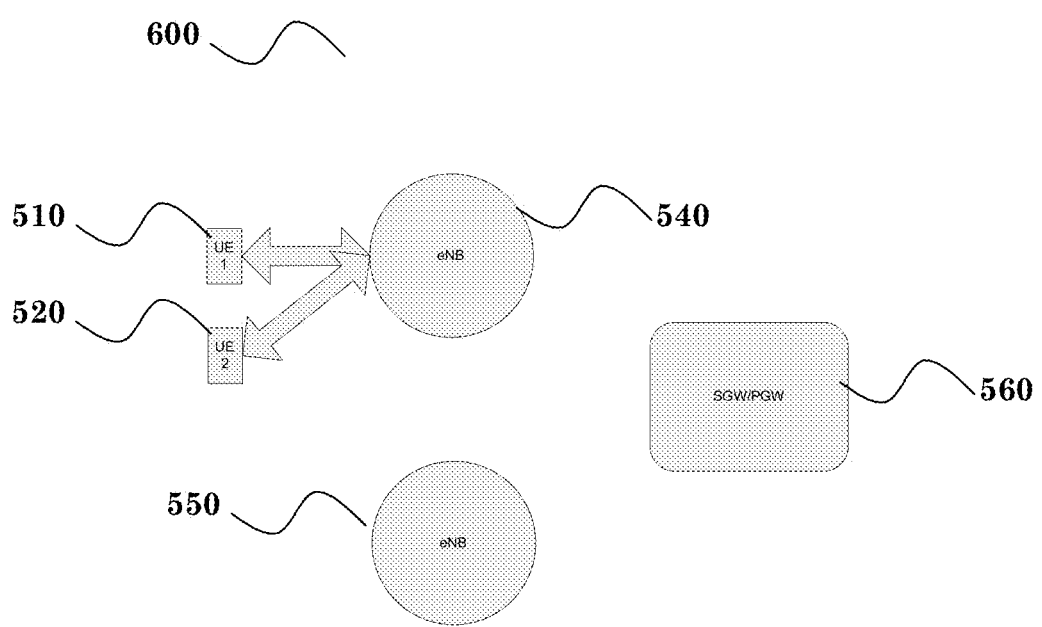
FIG. 6 is a block diagram of a locally-routed data path in the EPS for communication between two UEs when the UEs are served by the same eNB.

FIGS. 5 and 6 illustrate possible data paths for ProSe Communications. FIG. 5 illustrates a direct mode data path in the Evolved Packet System (EPS) for communication between two UEs 510, 520 in a system 500 is composed of two UEs 510, 520, two evolved Node B's (eNBs)540, 550 and a serving gateway and/or packet data network gateway (SGW/PGW) 560. FIG. 6 illustrates a locally-routed data path in the EPS for communication between two UEs 510, 520 when the UEs are served by the same eNB 540. In FIG. 6, the system 600 may be composed of two UEs 510, 520, two eNBs 540, 550, and a SGW/PGW 560.

Figure 7:
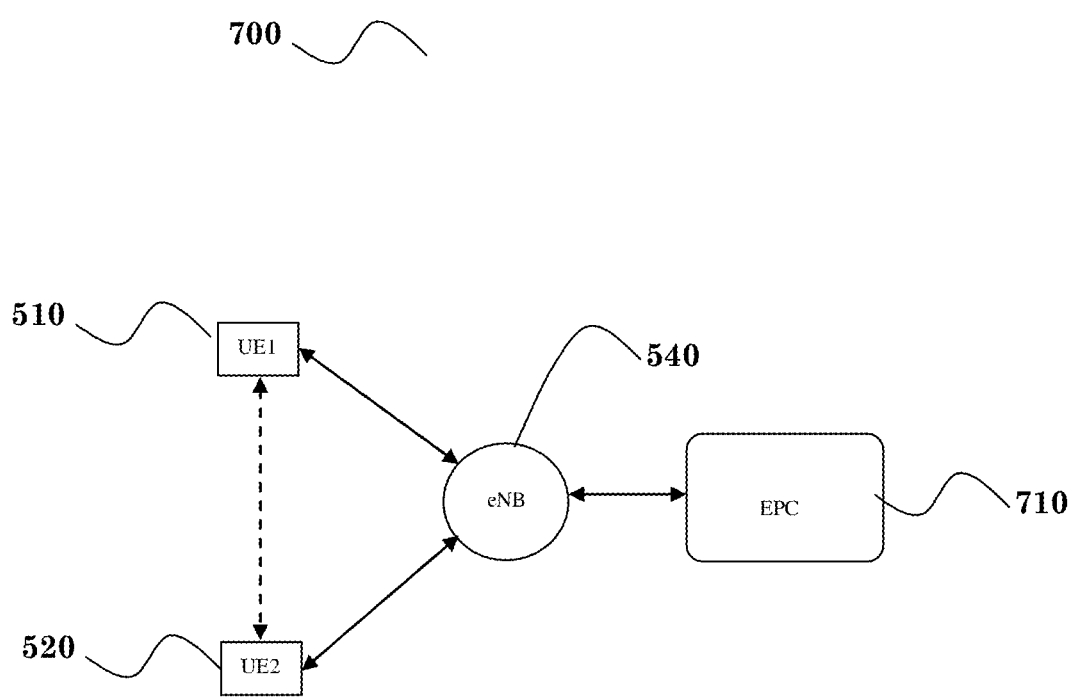
FIG. 7 is an exemplary block diagram of a control path for network supported Proximity Services (ProSe) communication for UEs served by the same eNB.
Figure 8:
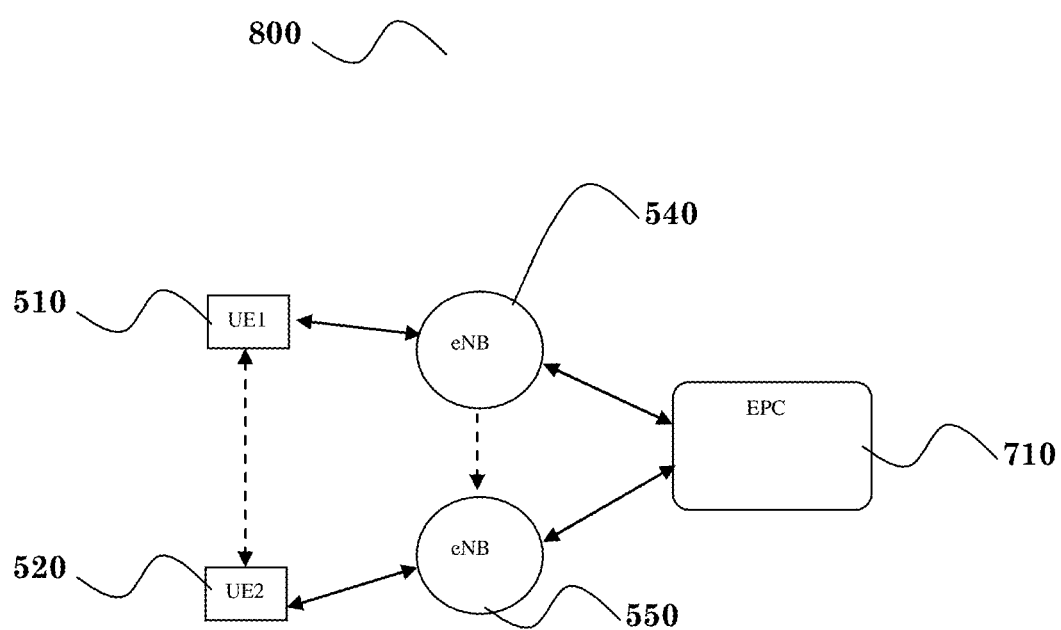
FIG. 8 is another exemplary block diagram of a control path for network supported ProSe Communication for UEs served by different eNBs.
Figure 9:
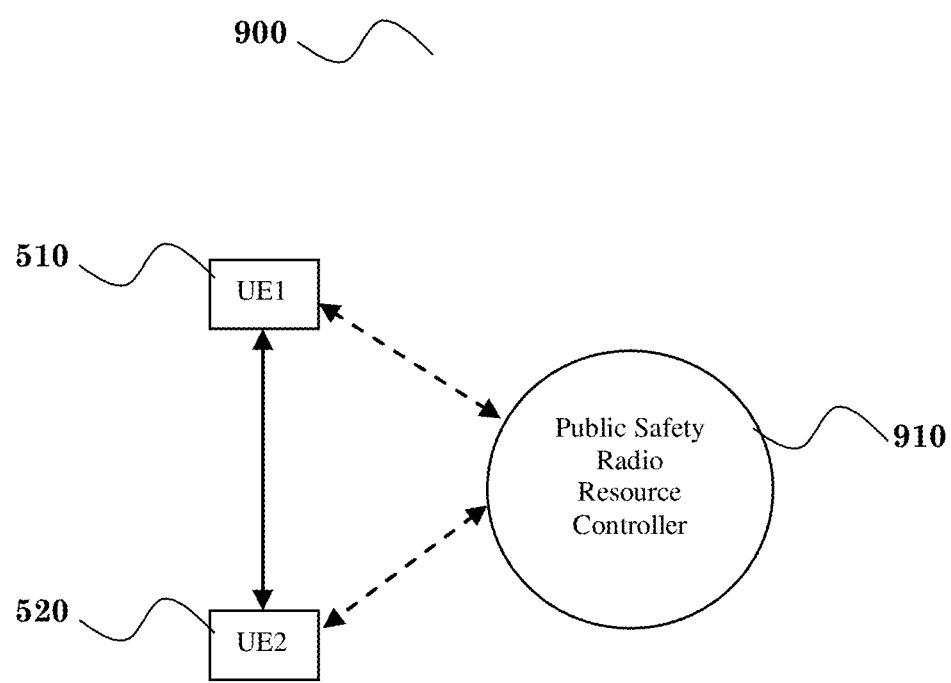
FIG. 9 is another exemplary block diagram of a control path for Public Safety ProSe Communication for UEs without network support.

FIGS. 7-9 illustrate possible control paths for ProSe Communications. FIG. 7 is an exemplary block diagram of a control path for network supported ProSe communication for UEs 510, 520 served by the same eNB 540. As shown in FIG. 7, the UEs 510, 520 communicate with the same eNB 540, which in turn communicates with an Evolved Packet Core (EPC) 710. FIG. 8 is another exemplary block diagram of a control path for network supported ProSe Communication for UEs 510, 520 served by different eNBs 540, 550. As shown in FIG. 8, a first UE 510 communicates with a first eNB 540, and the second UE 520 communicated with a second eNB 550. Each of the eNBs 540, 550 then communicates with the EPC 710. FIG. 9 is another exemplary block diagram of a control path for Public Safety ProSe Communication for UEs 510, 520 without network support. As shown in FIG. 9, the UEs 510, 520 communicate with a Public Safety Radio Resource Controller 910. Alternatively, for public safety purposes, a Public Safety UE can relay the radio resource management control information for other Public Safety UEs that do not have network coverage.

Some ProSe Discovery requirements are discussed in 3GPP TR 22.803 V1.0.0, "Feasibility Study for Proximity Services (ProSe)" and are quoted below:

> 5.1.1.5 Potential Requirements
>
> General
>
> Based on operator policy and user choice, the proximity of two ProSe-enabled UEs shall be determinable; for example, using direct radio signals or via the operator network.
>
> A discovering UE shall be able to determine whether or not a discovered UE is useful to it.
>
> Editor's Note: Role of the user, application and operator in such determination is FFS. Policy and user choice can set the ProSe feature to enable a UE:
> to discover other UEs in its proximity but not be discoverable;
> to be discoverable by other UEs but not be able to discover other UEs in its proximity;
> to discover other UEs in its proximity and be discoverable by other UEs;
> to disable to be discoverable by other UEs and the discovery of other UEs.
>
> ProSe Discovery shall support a minimum of three range classes—for example short, medium and maximum range.
>
> The operator shall be able to authorize per subscription which range classes ProSe Discovery is allowed to use.
>
> An application can request to use a certain ProSe Discovery range class.
>
> The impact of ProSe Discovery on battery consumption should be minimized at a level that is sufficient for the service and does not impact the user experience of using the UE.
>
> Subject to user and operator settings, a ProSe-enabled UE shall be discoverable only by other UEs in proximity that are explicitly permitted by the discoverable UE.
>
> ProSe shall allow the simultaneous operation of applications on a UE, ensuring that ProSe discovery info is only available to applications that were specifically authorized.
>
> An operator shall be able to authorize the use of ProSe Discovery information by an application.
>
> A user shall be able to allow the use of ProSe Discovery information by an application.
>
> ProSe Feature Authorization
>
> The operator shall be able to turn on or off the ProSe Discovery feature in its network.
>
> The operator shall be able to authorize discovery operations for each individual UE.
>
> The operator shall be able to authorize the ability of a UE to be discoverable by other UEs.
>
> The operator shall be able to authorize the ability of a UE to discover other UEs.
>
> Charging
>
> The operator shall be able to charge for ProSe Discovery features including:
> the ability for a UE to be discoverable including the range class;
> the ability to discover other UEs;
> the event of discovering a UE.
>
> And some relay requirements for Public Safety UEs are quoted as below:

5.2.9.5 Potential Requirements

An authorized public safety UE may be capable of acting as a relay for other public safety UEs.

An authorized public safety UE shall be capable of being enabled/disabled by a user or system to act as a relay for other public safety UEs.

The user of a ProSe-enable public safety UE acting as a relay should not perceive service degradation due to the relay.

3GPP SP-110638 proposes a new study item on proximity-based services (ProSe). The justification of this study item are quoted below:

3 Justification

Proximity-based applications and services represent a recent and enormous socio-technological trend. The principle of these applications is to discover instances of the applications running in devices that are within proximity of each other, and ultimately also exchange application-related data. In parallel, there is interest in proximity-based discovery and communications in the public safety community.

Current 3GPP specification are only partially suited for such needs, since all such traffic and signalling would have to be routed in the network, thus impacting their performance and adding un-necessary load in the network. These current limitations are also an obstacle to the creation of even more advanced proximity-based applications.

In this context, 3GPP technology, has the opportunity to become the platform of choice to enable proximity-based discovery and communication between devices, and promote a vast array of future and more advanced proximity-based applications.

3GPP TR 22.803 V1.0.0 captures the feasibility study for proximity services (ProSe). It defines three categories of communications for public safety service and also describes public safety use of ProSe as quoted below:

3.1 Definitions

ProSe Communication: a communication between two UEs in proximity by means of a communication path established between the UEs. The communication path could for example be established directly between the UEs or routed via local eNB(s).

. . .

ProSe Group Communication: a one-to-many ProSe Communication, between two or more UEs in proximity, by means of a common communication path established between the UEs.

ProSe Broadcast Communication: a one-to-all ProSe Communication, between all authorized UEs in proximity, by means of a common communication path established between the UEs.

4.3 Public Safety Use of ProSe

In the United States, LTE has been selected by the FCC as the technology [2] [3] [4] for the Public Safety Network. In Europe, there is an ongoing discussion on spectrum to be chosen for broadband Public Safety held by CEPT ECC WG FM PT 49 [8]. Additionally, a variety of public safety over ProSe requirements have been defined [5][6][7]. The requirements raise the following points for consideration in developing the ProSe requirements for public safety use.

A public safety UE can operate in the public safety spectrum for public safety service and in the MNO commercial spectrum, for general service (e.g. voice call), however, only the public safety spectrum is used for public safety ProSe.

Public safety UEs using ProSe communicate with each other even though they belong to different HPLMNs.

A public safety UE can automatically use ProSe when network coverage is not available, or the user can manually set the UE to use direct discovery and communication even when network coverage is available.

In addition, the following assumptions are made for public safety ProSe:

All public safety users utilize ProSe-enabled UEs

ProSe supports both UE discovery and data exchange

If and when other regional and/or regulatory requirements are raised, they will be taken into account.

Additionally, 3GPP TR 22.803 V1.0.0 also describes the public safety use cases of group communication and relay communication in ProSe as quoted below:

5.2.7 ProSe Group 5.2.7.1 Description

This use case describes the scenario where a user wants to communicate the same information concurrently to two or more other users using ProSe Group Communications. The UEs of all users in the scenario belong to a common communications group.

5.2.7.2 Pre-Conditions

An operator offers a service, which makes use of the ProSe feature.

Officer A, Officer B, and Officer C use ProSe-enabled public safety UEs.

Officer A, B, and C's UEs are configured to belong to communications group X.

Officer C has disabled ProSe Discovery on his/her UE.

Officer A, Officer B, and Officer C are subscribed to a Public Safety service that allows them to use ProSe.

Officer A's UE has discovered Officer B's UE via ProSe Discovery.

Officer A's UE has not discovered Officer C's UE via ProSe.

5.2.7.3 Service Flows

Officer A's UE transmits data using ProSe Group Communications to Officer B and Officer C's UEs concurrently.

5.2.7.4 Post-Conditions

None.

5.2.7.5 Potential Requirements

A Public Safety UE shall be capable of transmitting data to a group of Public Safety UEs using ProSe Group Communications with a single transmission, assuming they are within transmission range and authorized.

A Public Safety UE shall be capable of transmitting data to a group of Public Safety UEs directly using ProSe Group Communications.

A Public Safety UE shall be capable of receiving a ProSe Group Communications transmission, of which it is a group member, regardless of whether or not it has been discovered by the transmitting UE.

Group management is outside the scope of ProSe.

5.2.9 ProSe Relay 5.2.9.1 Description

This use case describes the scenario where a given UE acts as a communication relay for one or more UEs.

5.2.9.2 Pre-Conditions

An operator offers a service, which makes use of the ProSe feature.

Officer A, Officer B, and Officer C use ProSe-enabled public safety UEs.

Officer B's UE has a relay capability allowing it to receive and re-transmit ProSe Communications.

Officer A, Officer B, and Officer C are subscribed to a Public Safety service that allows them to use ProSe.

Officer A's UE, Officer B's UE, and Officer C's UE have each been configured to belong to communications group X.

Officer A's UE is within transmission range of Officer B's UE, and Officer B's UE is within transmission range of Officer C's UE, but Officer C's UE is not within transmission range of Officer A's UE.

5.2.9.3 Service Flows

Officer A wants to communicate with Officer B and Officer C in communications group X via ProSe Group Communications.

Officer B enables his/her UE to act as a relay for ProSe Group Communications.

Officer A's UE transmits a message to Officer B's UE using ProSe Group Communications.

Officer B's UE relays (receives and then re-transmits) the communication from Officer A's UE to Officer C's UE, all using ProSe Group Communications.

Officer B continues to act as a ProSe Group Communications relay until Officer C is back within transmission range of Officer A and Officer B.

5.2.9.4 Post-Conditions

None.

5.2.9.5 Potential Requirements

An authorized public safety UE may be capable of acting as a relay for other public safety UEs.

An authorized public safety UE shall be capable of being enabled/disabled by a user or system to act as a relay for other public safety UEs.

The user of a ProSe-enable public safety UE acting as a relay should not perceive service degradation due to the relay.

Currently, only use cases and requirements for ProSe Discovery are specified in 3GPP TR 22.803 V1.0.0, "Feasibility Study for Proximity Services (ProSe)." The way to realize ProSe Discovery and fulfil those requirements is not designed yet. One main difference compared to the existing peer to peer connection technologies, e.g. Bluetooth, Wi-Fi ad hoc, Wi-Fi Direct, or the like, is that the operator should be in control of the ProSe Discovery functions, such as for example: authorize the range class of ProSe Discovery; turn on or off the ProSe Discovery; authorize and charge discovery operations; authorize and charge the ability of a UE to be discoverable by other UEs; and authorize and charge the ability of a UE to discover other UEs.

In order to realize ProSe Discovery with involvement of operator's control, new signaling is required. The content of the signaling and the signaling flow need to be designed to fulfill the requirements for ProSe Discovery. Additionally, the signaling may also need to carry further information to assist other ProSe functions, such as, but not limited to, ProSe Communication, relay, or the like.

First Signaling

A first (ProSe-enabled) UE to be discoverable by a second UE may transmit a first signaling including specific information, for being discovered purpose, to the second UE. The specific information can include one or multiple information below:

(a) A cell identity, e.g. CellIdentity as disclosed in 3GPP TS 36.331 V11.1.0, "E-UTRA RRC protocol specification (Release 11)", indicating a cell that the first UE is camping on or connecting to.

(b) A Public Land Mobile Network (PLMN) identity, e.g. PLMN-Identity, or Registered Public Land Mobile Network (RPLMN) as disclosed in 3GPP TS 36.331 V11.1.0, "E-UTRA RRC protocol specification (Release 11)". It may indicate that a cell, the first UE is camping on or connecting to, belongs to which PLMN.

(c) A global cell identity, e.g. CellGlobalIdEUTRA as disclosed in 3GPP TS 36.331 V11.1.0, "E-UTRA RRC protocol specification (Release 11)", indicating a cell the first UE is camping on or connecting to.

(d) A C-RNTI (as disclosed in 3GPP TS 36.321 V11.0.0, "E-UTRA MAC protocol specification (Release 11)") of the first UE.

(e) An indication to indicate whether the first UE has network coverage or not.

(f) An indication to indicate whether the first UE needs ProSe relay or not.

(g) An indication to indicate whether the first UE can be ProSe relay or not.

(h) An indication to indicate the range class for ProSe Discovery used by the first UE.

(i) An indication to indicate information related to the transmission power for ProSe Discovery used by the first UE.

(j) An indication to indicate the range class for ProSe Communication used by the first UE.

(k) An indication to indicate the maximum range class for ProSe Communication that can be used by the first UE.

(l) An indication, e.g. application or service identity, to indicate the application or service in the first UE which is using the ProSe Discovery.

(m) A Temporary Mobile Subscriber Identity (TMSI), Packet TMSI (P-TMSI), System Architecture Evolution TMSI (S-TMSI), or Mobile Management Entity TMSI (M-TMSI) (as disclosed in TS 23.003 V11.3.0, "Numbering, addressing and identification") of the first UE.

Information (a) to (d) or (m) exists in a LTE system and is known by the UE. Accordingly, the information (a) to (d) or (m) could be used to identify the UE to save the complexity of new identity design and new identity allocation procedure. Based on information (a) to (d) or (m), the identity and location of the UE can be known by other UEs or the network. The identity of the UE can be used for authorizing and charging, and the location of the UE can be used to decide the data or control path for ProSe Communication. Information (e)-(g) may be used to realize ProSe relay function such as, but not limited to, choosing relay, whether to enable relay feature, or the like. Information (h)-(k) may be used to analyze radio condition or channel quality or whether to use ProSe Communication. Information (l) may be used by the second UE whether to perform further actions, e.g. authentication or authorization check, upon receiving the first signaling.

The first signaling may be transmitted periodically, upon enabling ProSe Discovery for an application or service, upon opening an application or service with enabled ProSe Discovery, upon changing the content of signaling, upon handover completion, upon entering RRC_CONNECTED, upon changing discoverable permission, or the like. The transmission of the first signaling may be restricted by a timer, such as a prohibit timer.

Second Signaling

Alternatively, a second (ProSe-enabled) UE may discover a first UE by transmitting a second signaling that includes specific information, for discovering purposes, to the first UE. The specific information can include one or multiple information below:

(a) A cell identity, e.g. CellIdentity as disclosed in 3GPP TS 36.331 V11.1.0, "E-UTRA RRC protocol specification (Release 11)", indicating a cell the second UE is camping on or connecting to.

(b) A PLMN identity, e.g. PLMN-Identity, or RPLMN as disclosed in 3GPP TS 36.331 V11.1.0, "E-UTRA RRC protocol specification (Release 11)". It may indicate that a cell, the second UE is camping on or connecting to, belongs to which PLMN.

(c) A global cell identity, e.g. CellGlobalIdEUTRA as disclosed in 3GPP TS 36.331 V11.1.0, "E-UTRA RRC protocol specification (Release 11)", indicating a cell the second UE is camping on or connecting to.

(d) A C-RNTI (as disclosed in 3GPP TS 36.321 V11.0.0, "E-UTRA MAC protocol specification (Release 11)") of the second UE.

(e) An indication to indicate whether the second UE has network coverage or not.

(f) An indication to indicate whether the second UE needs ProSe relay or not.

(g) An indication to indicate whether the second UE can be ProSe relay or not.

(h) An indication to indicate the range class for ProSe Discovery used by the second UE.

(i) An indication to indicate information related to the transmission power for ProSe Discovery used by the second UE.

(j) An indication to indicate the range class for ProSe Communication used by the second UE.

(k) An indication to indicate the maximum range class for ProSe Communication that can be used by the second UE.

(l) An indication, e.g. application or service identity, to indicate the application or service in the second UE which is using the ProSe Discovery.

(m) A TMSI, P-TMSI, S-TMSI, or M-TMSI (as disclosed in TS 23.003 V11.3.0, "Numbering, addressing and identification") of the second UE.

Information (a) to (d) or (m) exists in a LTE system and is known by the UE. Accordingly, the information (a) to (d) or (m) could be used to identify the UE to save the complexity of new identity design and new identity allocation procedure. Based on information (a) to (d) or (m), the identity and location of the UE can be known by other UEs or the network. The identity of the UE can be used for authorizing and charging, and the location of the UE can be used to decide the data or control path for ProSe Communication. Information (e)-(g) may be used to realize ProSe relay function such as, but not limited to, choosing relay, whether to enable relay feature, or the like. Information (h)-(k) may be used to analyze radio condition or channel quality or whether to use ProSe Communication. Information (l) may be used by the second UE whether to perform further actions, e.g. authentication or authorization check, upon receiving the second signaling.

The second signaling may be transmitted periodically, upon enabling ProSe Discovery for an application or service, upon opening an application or service with enabled ProSe Discovery, upon changing the content of signaling, upon handover completion, upon entering RRC_CONNECTED, upon changing discoverable permission, or the like. The transmission of the second signaling may be restricted by a timer, such as a prohibit timer.

Third Signaling

Alternatively, a first (ProSe-enabled) UE, which may be discoverable by a second UE, may transmit a third signaling including specific information to network. The third signaling may be used to: check with network whether the first UE can be discovered by the second UE (for a specific application or service); find an identity in a specific application or service corresponding to the first UE and/or the second UE; report the ProSe Discovery operations of the first UE and/or the second UE; or check authorization of ProSe Discovery for the first UE and/or the second UE.

The specific information can include one or multiple information below:

(a) A cell identity, e.g. CellIdentity as disclosed in 3GPP TS 36.331 V11.1.0, "E-UTRA RRC protocol specification (Release 11)", received from the second UE. It may be omitted if the value is the same as a cell the first UE is camping on or connecting to.

(b) A PLMN identity, e.g. PLMN-Identity, or RPLMN as disclosed in 3GPP TS 36.331 V11.1.0, "E-UTRA RRC protocol specification (Release 11)", received from the second UE. It may be omitted if the value is the same as the PLMN the first UE is camping on or connecting to.

(c) A global cell identity, e.g. CellGlobalIdEUTRA as disclosed in 3GPP TS 36.331 V11.1.0, "E-UTRA RRC protocol specification (Release 11)", received from the second UE. It may be omitted if the value is the same as a cell the first UE is camping on or connecting to.

(d) A C-RNTI (as disclosed in 3GPP TS 36.321 V11.0.0, "E-UTRA MAC protocol specification (Release 11)") received from the second UE.

(e) An indication to indicate whether the second UE has network coverage or not.

(f) An indication to indicate whether the second UE needs ProSe relay or not.

(g) An indication to indicate whether the second UE can be ProSe relay or not.

(h) An indication to indicate whether the first UE can be ProSe relay or not.

(i) An indication to indicate the range class for ProSe Discovery used by the second UE.

(j) An indication to indicate information related to the transmission power for ProSe Discovery used by the second UE.

(k) An indication to indicate the range class for ProSe Communication used by the second UE.

(l) An indication, e.g. CQI or received power, to indicate the radio condition or channel quality between the first UE and the second UE.

(m) An indication, e.g. application or service identity, to indicate the application or service in the first UE is using the ProSe Discovery.

(n) An indication, e.g. application or service identity, received from the second UE.

(o) A TMSI, P-TMSI, S-TMSI, or M-TMSI (as disclosed in TS 23.003 V11.3.0, "Numbering, addressing and identification") of the second UE.

Information (a) to (d) or (o) exists in a LTE system and is known by the UE. Accordingly, the information (a) to (d) or (o) could be used to identify the UE to save the complexity of new identity design and new identity allocation procedure. Based on information (a) to (d) or (o), the identity and location of the UE can be known by other UEs or the network. The identity of the UE can be used for authorizing and charging, and the location of the UE can be used to decide the data or control path for ProSe Communication. Information (e)-(h) may be used to realize ProSe relay function such as, but not limited to, choosing relay, whether to enable relay feature, or the like. Information (i)-(l) may be used to analyze radio condition or channel quality or whether to use ProSe Communication. Information (m)-(n) may be used for authentication or authorization of ProSe Discovery. The transmission of the third signaling may be restricted by a timer, such as a prohibit timer.

Fourth Signaling

Alternatively, a second (ProSe-enabled) UE to discover a first UE may transmit a fourth signaling including specific information to network. The fourth signaling may be used to: check with network whether the first UE can be discovered by the second UE (for a specific application or service); find an identity in a specific application or service corresponding to the first UE and/or the second UE; report the ProSe Discovery operations of the first UE and/or the second UE; or check authorization of ProSe Discovery for the first UE and/or the second UE.

The specific information can include one or multiple information below:

(a) A cell identity, e.g. CellIdentity as disclosed in 3GPP TS 36.331 V11.1.0, "E-UTRA RRC protocol specification (Release 11)", received from the first UE. It may be omitted if the value is the same as a cell the second UE is camping on or connecting to.

(b) A PLMN identity, e.g. PLMN-Identity, or RPLMN as disclosed in 3GPP TS 36.331 V11.1.0, "E-UTRA RRC protocol specification (Release 11)", received from the first UE. It may be omitted if the value is the same as the PLMN the second UE is camping on or connecting to.

(c) A global cell identity, e.g. CellGlobalIdEUTRA as disclosed in 3GPP TS 36.331 V11.1.0, "E-UTRA RRC protocol specification (Release 11)", received from the first UE. It may be omitted if the value is the same as a cell the second UE is camping on or connecting to.

(d) A C-RNTI (as disclosed in 3GPP TS 36.321 V11.0.0, "E-UTRA MAC protocol specification (Release 11)") received from the first UE.

(e) An indication to indicate whether the first UE has network coverage or not.

(f) An indication to indicate whether the first UE needs ProSe relay or not.

(g) An indication to indicate whether the first UE can be ProSe relay or not.

(h) An indication to indicate whether the second UE can be ProSe relay or not.

(i) An indication to indicate the range class for ProSe Discovery used by the first UE.

(j) An indication to indicate information related to the transmission power for ProSe Discovery used by the first UE.

(k) An indication to indicate the range class for ProSe Communication used by the first UE.

(l) An indication, e.g. CQI or received power, to indicate the radio condition or channel quality between the first UE and the second UE.

(m) An indication, e.g. application or service identity, to indicate the application or service in the second UE is using the ProSe Discovery.

(n) An indication, e.g. application or service identity, received from the first UE.

(o) A TMSI, P-TMSI, S-TMSI, or M-TMSI (as disclosed in TS 23.003 V11.3.0, "Numbering, addressing and identification") of the first UE.

Information (a) to (d) or (o) exists in a LTE system and is known by the UE. Accordingly, the information (a) to (d) or (o) could be used to identify the UE to save the complexity of new identity design and new identity allocation procedure. Based on information (a) to (d) or (o), the identity and location of the UE can be known by other UEs or the network. The identity of the UE can be used for authorizing and charging, and the location of the UE can be used to decide the data or control path for ProSe Communication. Information (e)-(h) may be used to realize ProSe relay function such as, but not limited to, choosing relay, whether to enable relay feature, or the like. Information (i)-(l) may be used to analyze radio condition or channel quality or whether to use ProSe Communication. Information (m)-(n) may be used for authentication or authorization of ProSe Discovery. The transmission of the fourth signaling may be restricted by a timer, such as a prohibit timer.

Signaling Flow

Figure 10:
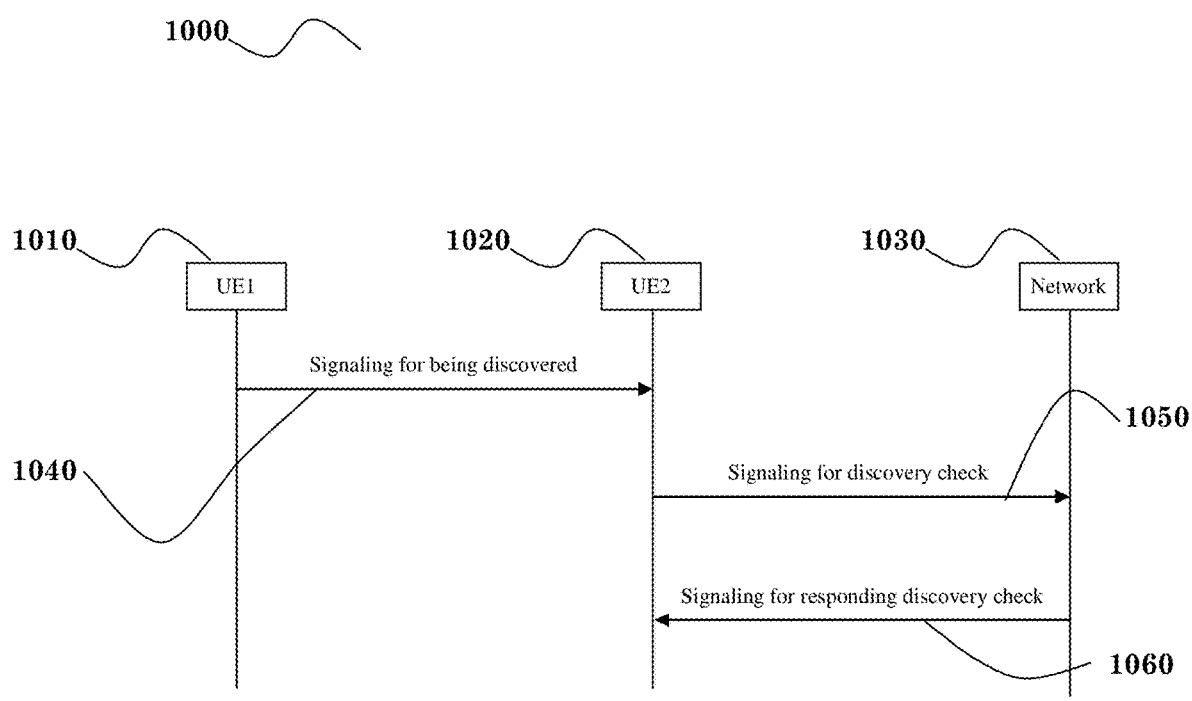
FIG. 10 is a signaling flow diagram according to one exemplary embodiment.
Figure 11:
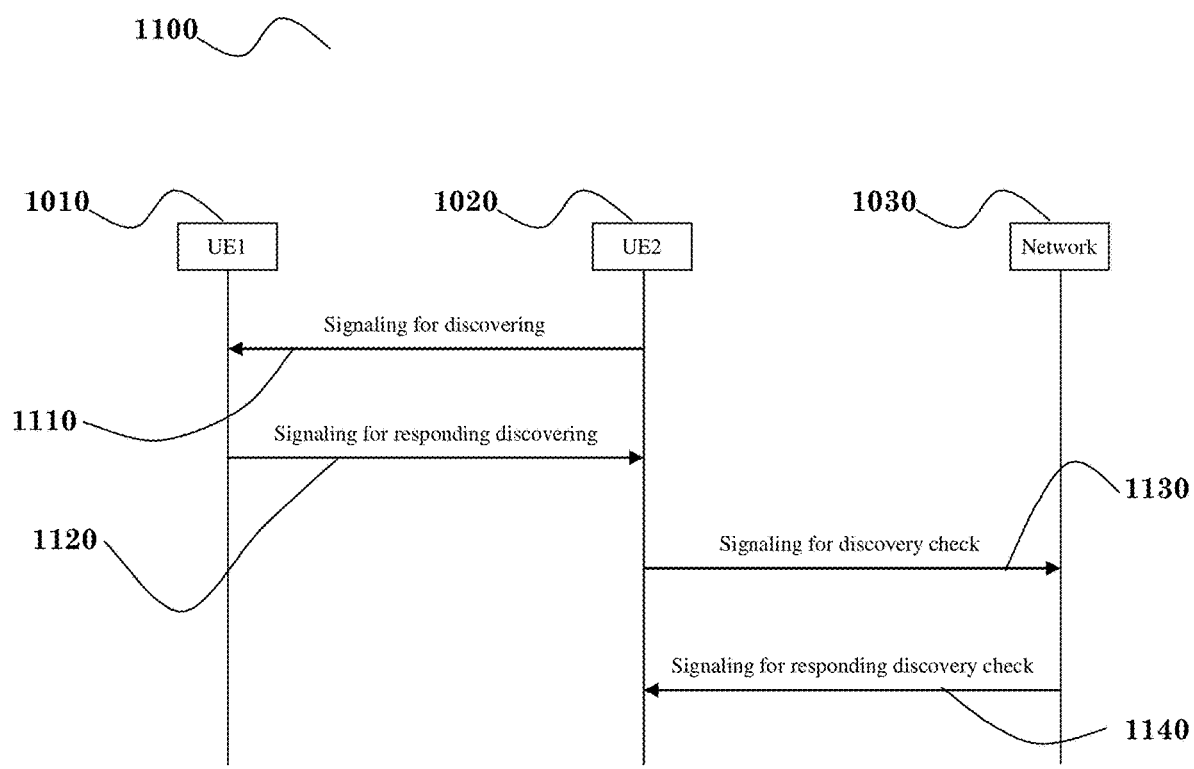
FIG. 11 is a signaling flow diagram according to one exemplary embodiment.
Figure 12:
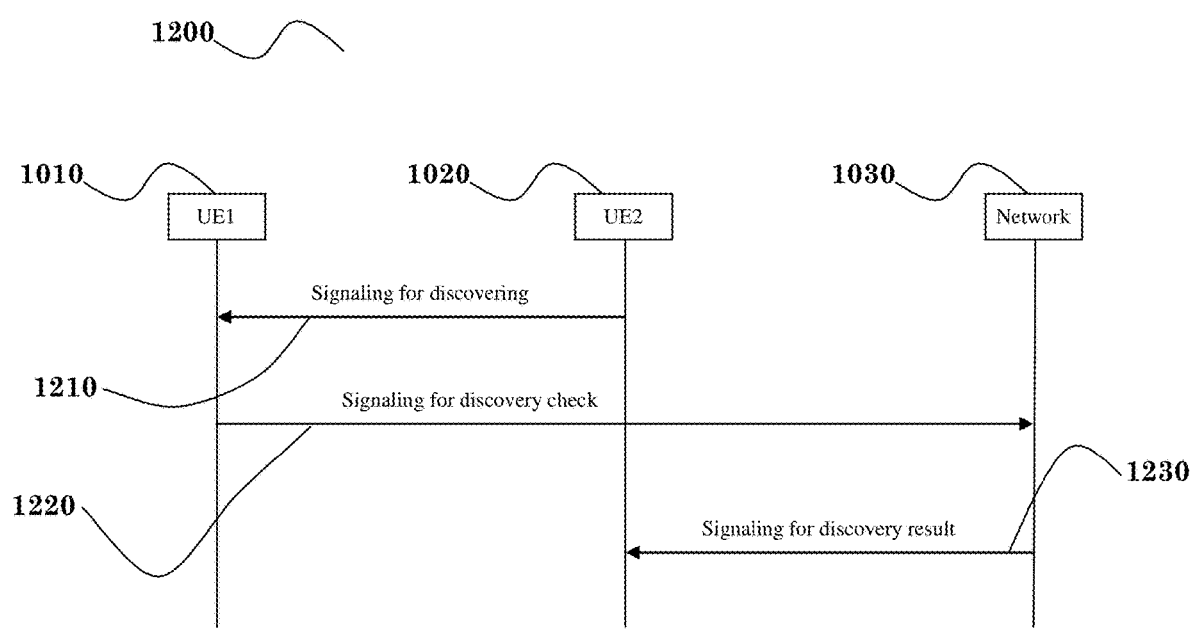
FIG. 12 is a signaling flow diagram according to one exemplary embodiment.

FIGS. 10-12 are embodiments of signaling flow to realize ProSe Discovery.

In FIG. 10, UE1 1010 transmits or broadcasts a signaling for being discovered 1040, e.g., the first signalling disclosed in paragraphs [0049]-[0065]. When UE2 1020 receives the signaling for being discovered 1040, UE2 transmits a signaling for discovery check 1050, e.g., the fourth signalling disclosed in paragraphs [00102]-[00120], based on the received signaling to check whether UE2 discovers anyone or who is discovered by UE2 (for a specific application or service). The Network 1030 responds to UE2 1020 with a signaling for responding discovery check 1060 about who is discovered by UE2, location information, and/or information related to ProSe Communication.

In FIG. 11, UE2 1020 transmits or broadcasts a signaling for discovering 1110, e.g., the second signalling disclosed in paragraphs [0066]-[0082]. When UE1 1010 receives the signaling for discovering 1110, UE1 may decide to response UE2 with a signaling for responding discovering 1120, e.g., the first signalling disclosed in paragraphs [0049]-[0065]. When UE2 1020 receives the response 1120, UE2 transmits a signaling for discovery check 1130, e.g., the fourth signalling disclosed in paragraphs [00102]-[00120], based on the received signaling to check whether UE2 discovers anyone or who is discovered by UE2 (for a specific application or service). The Network 1030 responds to UE2 1020 with a signaling for responding discovery check 1140 about who is discovered by UE2, location information, and/or information related to ProSe Communication.

In FIG. 12, UE2 1020 transmits or broadcasts a signaling for discovering 1210, e.g., the second signalling disclosed in paragraphs [0066]-[0082]. When UE1 1010 receives the signaling 1210, UE1 transmits a signaling for discovery check 1210, e.g., the third signalling disclosed in paragraphs [0083]-[00101], based on the received signaling to check whether UE2 1020 discovers anyone or who is discovered by UE2 (for a specific application or service). The Network 1030 transmits a signaling for discovery result 1230 to UE2 1020 about who is discovered by UE2, location information, and/or information related to ProSe Communication.

Referring back to FIGS. 3 and 4, the device 300 includes a program code 312 stored in memory 310. In one embodiment, the CPU 308 could execute the program code 312 (i) to receive, from a first user equipment, a discovery signal by a second user equipment for discovering or being discovered; (ii) to transmit, from the second user equipment, a discovery check signal to a network in response to the discovery signal to check a discovery result. In another embodiment, the CPU 308 could execute the program code 312 to transmit, from a first user equipment, a discovery signal to a second user equipment for discovering or being discovered, wherein the discovery signal comprises at least one of the following information: (1) a cell identity indicating a cell that the first user equipment is camping on or connecting to; (2) a PLMN identity indicating a PLMN of a cell that the first user equipment is camping on or connecting to; (3) an indication about whether the first user equipment has network coverage or not; (4) an indication about whether the first user equipment needs a proximity service relay or not; (5) an indication about whether the first user equipment can be a proximity service relay or not; (6) an indication about range class for proximity service discovery or proximity service communication used by the first user equipment; (7) an indication about transmission power for proximity service discovery used by the first user equipment; or (8) a TMSI, P-TMSI, S-TMSI, or M-TMSI of the first user equipment.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for proximity service discovery in a wireless communication system, the method comprising:
 receiving, by a second user equipment (UE), a discovery signal sent from a first UE for discovering or being discovered, wherein the discovery signal includes a Public Land Mobile Network (PLMN) identity and a first indication to indicate an application or service in the first UE which is using proximity service discovery; and
 transmitting, from the second UE, a discovery check signal to an access network, which is operatively connected to the second UE, in response to the discovery signal to find an identity in the application or service corresponding to the first UE,
 wherein the discovery check signal includes the first indication and the PLMN identity received from the first UE; and
 receiving, by the second UE, a response signal that the access network sends in response to receiving the discovery check signal from the second UE, wherein the response signal includes a discovery result and the discovery result includes the identity in the application or service corresponding to the first UE.

2. The method of claim 1, wherein the discovery result includes:
 (i) an identity of a discovered UE,
 (ii) a location information,
 (iii) an information related to proximity service communication, or
 (iv) any combination thereof.

3. The method of claim 1, wherein the PLMN identity is a Registered Public Land Mobile Network (RPLMN) which is the last PLMN in which the first UE has registered successfully.

4. The method of claim 1, wherein transmission of the discovery check signal is restricted by a timer.

5. The method of claim 1, wherein the discovery signal includes a cell identity indicating a cell that the first UE is camping on or is connected to.

6. The method of claim 1, wherein the PLMN identity is for a PLMN to which a cell, which the first UE is camping on or is connected to, belongs.

7. The method of claim 1, wherein the discovery signal includes a second indication to indicate whether the first UE has network coverage or not.

8. The method of claim 1, wherein the discovery check signal includes (i) a cell identity received from the first UE, (ii) a second indication whether the first UE has network coverage, or (iii) any combination thereof.

* * * * *